US011256595B2

(12) United States Patent
Khokhar et al.

(10) Patent No.: US 11,256,595 B2
(45) Date of Patent: Feb. 22, 2022

(54) PREDICTIVE STORAGE MANAGEMENT SYSTEM

(71) Applicant: Dell Products L.P., Round Rock, TX (US)

(72) Inventors: Muzhar S. Khokhar, Shrewsbury, MA (US); Binbin Wu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 16/509,322

(22) Filed: Jul. 11, 2019

(65) Prior Publication Data

US 2021/0011830 A1    Jan. 14, 2021

(51) Int. Cl.
*G06F 11/34* (2006.01)
*G06F 3/06* (2006.01)
*G06F 9/455* (2018.01)

(52) U.S. Cl.
CPC .......... *G06F 11/3442* (2013.01); *G06F 3/064* (2013.01); *G06F 3/0604* (2013.01); *G06F 3/067* (2013.01); *G06F 3/0664* (2013.01); *G06F 3/0689* (2013.01); *G06F 9/45533* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,950,871 B1 | 9/2005 | Honma et al. | |
| 10,586,052 B1* | 3/2020 | Marelas | G06F 21/577 |
| 2010/0082321 A1 | 4/2010 | Cherkasova et al. | |
| 2017/0220387 A1* | 8/2017 | Borowiec | G06F 3/0604 |
| 2017/0286209 A1* | 10/2017 | Heroor | G06F 11/0787 |
| 2018/0027057 A1* | 1/2018 | Balle | G06F 3/0625 709/226 |
| 2018/0067881 A1* | 3/2018 | Frandzel | G06F 13/1642 |
| 2018/0113640 A1* | 4/2018 | Fernandez | G06F 3/061 |
| 2019/0278498 A1* | 9/2019 | Dedrick | G06F 3/0631 |
| 2020/0192572 A1* | 6/2020 | Dwarampudi | G06F 3/064 |
| 2021/0011647 A1* | 1/2021 | Coleman | G06F 3/061 |

* cited by examiner

*Primary Examiner* — William E. Baughman
(74) *Attorney, Agent, or Firm* — Joseph Mencher

(57) ABSTRACT

A predictive storage management system includes a storage system having storage devices, and a predictive storage management device coupled to the storage system via a network. The predictive storage management device includes a statistical time-series storage device usage sub-engine that retrieves first storage device usage data from a first storage device in the storage system and uses it to generate a first storage device usage trend model. A machine-learning storage system usage sub-engine in the predictive storage management device retrieves storage system implementation information from the storage system and uses it to generate a storage system implementation model. A storage management sub-engine in the predictive storage management device analyzes the first storage device usage trend model and the storage system implementation model to predict future usage of the first storage device and, based on that predicted future usage, performs a management action associated with the first storage device.

20 Claims, 11 Drawing Sheets

PREDICTIVE STORAGE MANAGEMENT SYSTEM

BACKGROUND

The present disclosure relates generally to information handling systems, and more particularly to managing storage devices in an information handling systems based on predictions about future usage of those storage devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in a Hyper-Converged Infrastructure (HCI) systems that may be provided by a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided one or more server devices. HCI systems have evolved from conventional discrete, hardware-defined systems that are connected and packaged together to a software-defined environment in which the functional elements are provided via server device(s) and converged via a hypervisor. In many situations, it is desirable to analyze the use of the virtualized SAN in order to perform a variety of management operations associated with the storage devices in the storage system that provides that virtualized SAN. However, conventional virtualized SAN use analysis is limited to analyzing the previous use of the virtualized SAN via statistical time-series models that tend to be poor at predicting virtualized SAN usage trends due to, for example, many time-series data sets exhibiting abrupt trend changes, step functions, periodicity, and significantly different growth rates. As such, conventional virtualized SAN use analysis is deficient in accurately predicting virtualized SAN usage trends, preventing useful storage device management functions including real-time storage capacity provisioning recommendations (e.g., to add new storage devices to the storage system that provides the virtualized SAN because a current storage capacity will be used up in the future), data purging, storage device/storage system reconfiguration, and/or other storage device management functions known in the art.

Accordingly, it would be desirable to provide an improved storage management system.

SUMMARY

According to one embodiment, an Information Handling System (IHS) includes a processing system; and a memory system that is coupled to the processing system and that includes instructions that, when executed by the processing system, cause the processing system to provide a predictive storage management engine that is configured to: retrieve first storage device usage data from a first storage device included in the plurality of storage devices in a storage system; generate, using the first storage device usage data, a first storage device usage trend model; retrieve storage system implementation information from the storage system; generate, using the storage system implementation information, a storage system implementation model; analyze the first storage device usage trend model and the storage system implementation model to predict future usage of the first storage device; and perform, based on the predicted future usage of the first storage device, a management action associated with the first storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
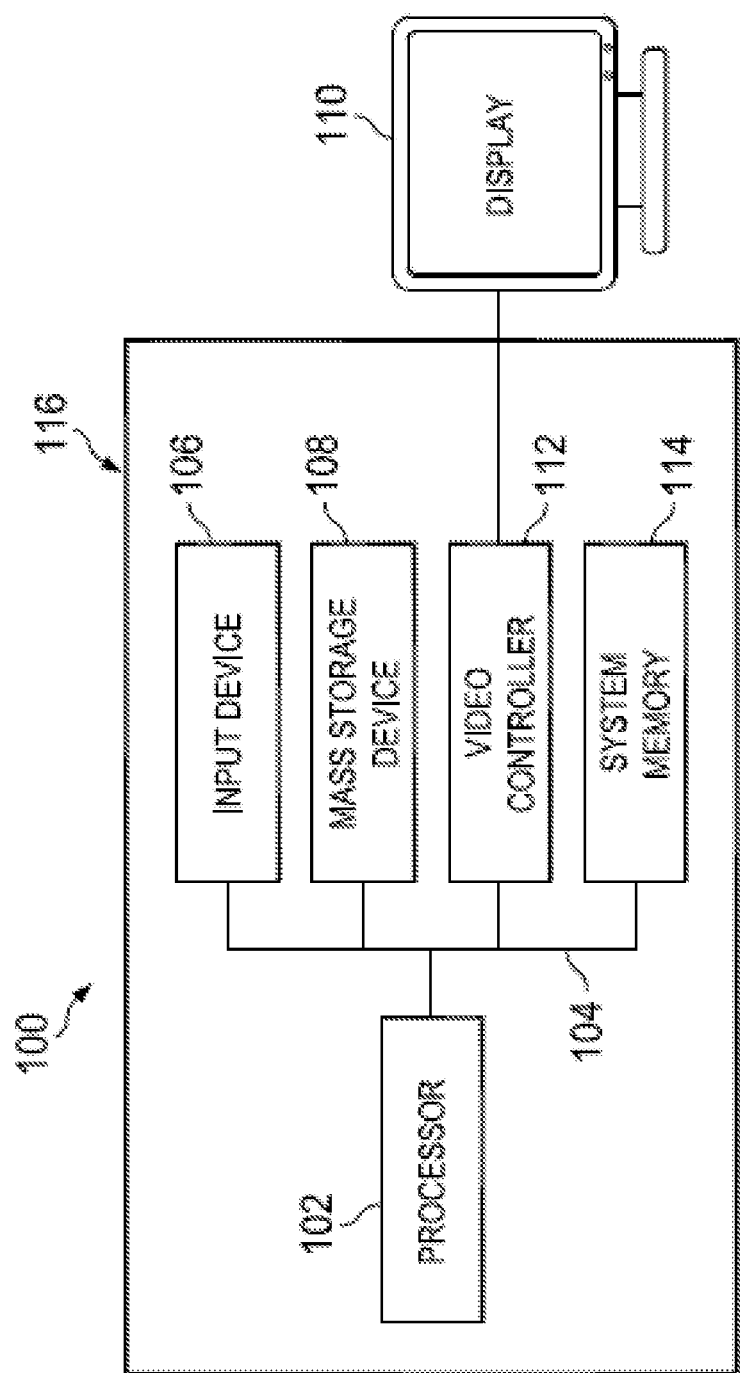
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
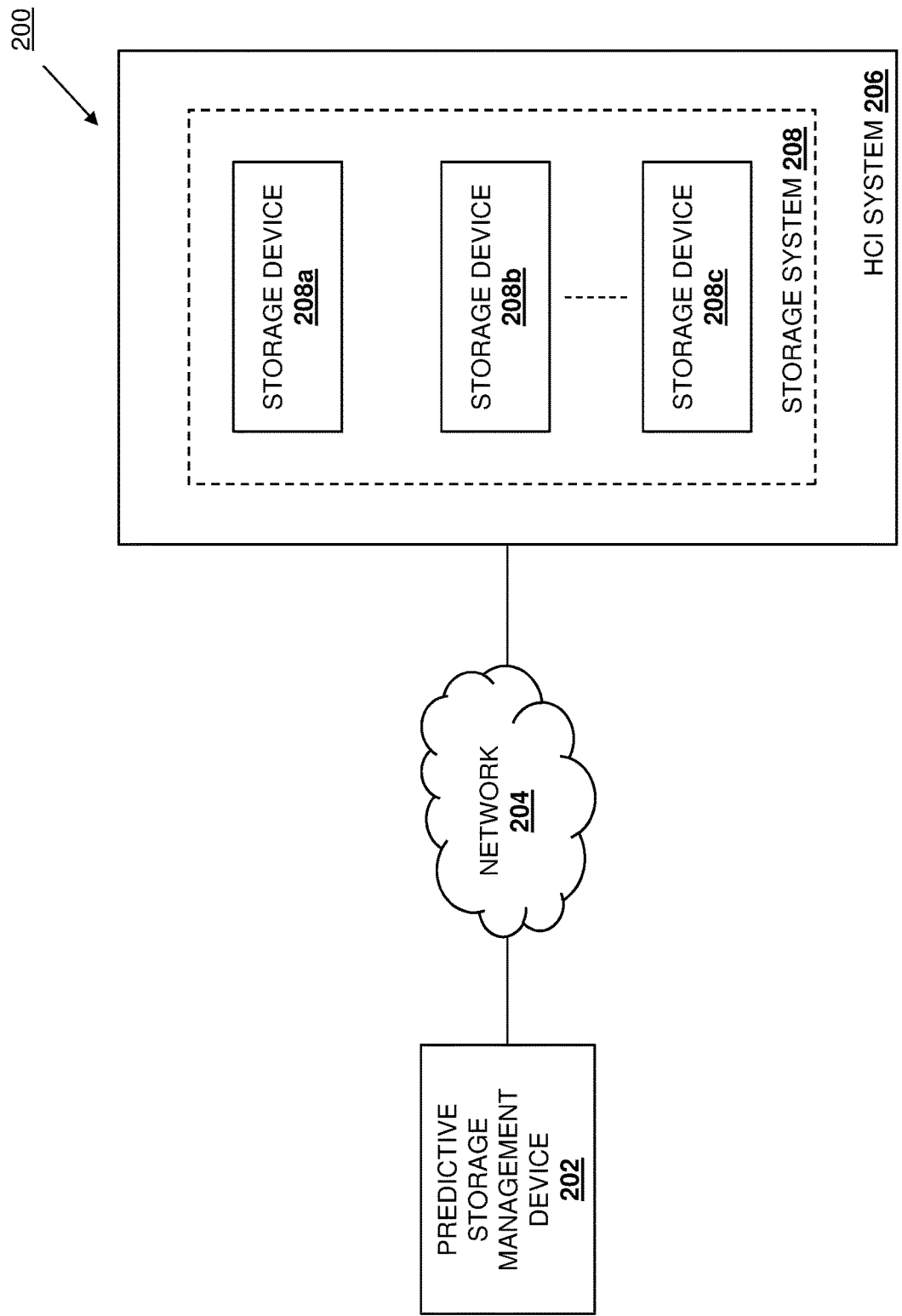
FIG. 2 is a schematic view illustrating an embodiment of predictive storage management system.

Referring now to FIG. 2, an embodiment of a predictive storage management system 200 is illustrated. In the illustrated embodiment, the predictive storage management system 200 includes a predictive storage management device 202 that, in the examples below, provides for the management of storage in an HCI system. However, one of skill in the art in possession of the present disclosure will recognize that the teachings of the present disclosure may be beneficial to storage systems in non-HCI systems, and thus the application of the teachings of the present disclosure to those situations will fall within the scope of the present disclosure as well. In an embodiment, the predictive storage management device 202 may be provided by the IHS 100 discussed above with reference to FIG. 1, and/or may include some or all of the components of the IHS 100. For example, one of skill in the art in possession of the present disclosure will recognize that the predictive storage management device 202 is described below as a server device. However, while illustrated and discussed as a server device, one of skill in the art in possession of the present disclosure will recognize that predictive storage management device 202 provided in the predictive storage management system 200 may include any number of server devices and/or other devices that may be configured to operate similarly as the predictive storage management device 202 discussed below.

The predictive storage management device 202 is coupled to a network 204 that may be provided by a Local Area Network (LAN), the Internet, combinations thereof, and/or any network and/or network combination that would be apparent to one of skill in the art in possession of the present disclosure. In the illustrated embodiment, an HCI system 206 is coupled to the predictive storage management device 202 via the network 204. As discussed above, the HCI system 206 may include a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided one or more server devices. As such, the HCI system 206 may be provided by the IHS 100 discussed above with reference to FIG. 1, may include some or all of the components of the IHS 100, and in specific examples is provided by a plurality of server devices. In the illustrated embodiment, the HCI system 204 includes a storage system 208 having a plurality of storage devices 208a, 208b, and up to 208c, which one of skill in the art in possession of the present disclosure will recognize may be included in the one or more server devices utilized to provide the HCI system 206. While not illustrated, one of skill in the art in possession of the present disclosure will recognize that the HCI system 206 includes a variety of other components (e.g., processing system(s), networking system(s), etc.) that provide the HCI system 206, but that are not illustrated for clarity. Furthermore, while a specific predictive storage management system 200 has been illustrated and described, one of skill in the art in possession of the present disclosure will recognize that the predictive storage management system of the present disclosure may include a variety of components and component configurations while remaining within the scope of the present disclosure as well.

Figure 3:
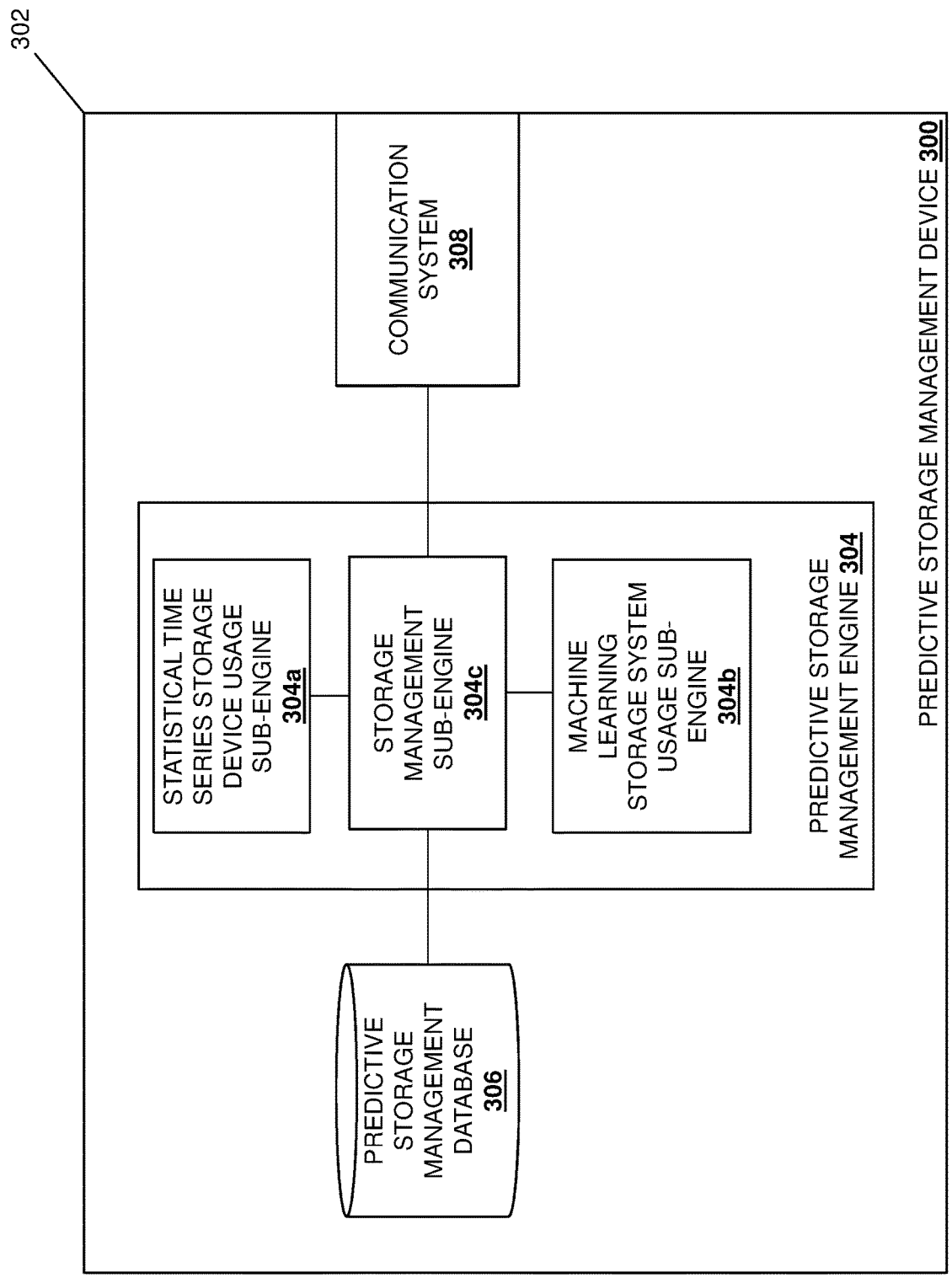
FIG. 3 is a schematic view illustrating an embodiment of a predictive storage management device that may be included in the predictive storage management system of FIG. 2.

Referring now to FIG. 3, an embodiment of a predictive storage management device 300 is illustrated that may provide the predictive storage management device 202 discussed above with reference to FIG. 2. As such, the predictive storage management device 300 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the predictive storage management device 300 discussed below may be provided by several server devices and/or other devices that are configured to operate similarly as the predictive storage management device 300 discussed below. In the illustrated embodiment, the predictive storage management device 300 includes a chassis 302 that houses the components of the predictive storage management device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a predictive storage management engine 304 that is configured to perform the functionality of the predictive storage management engines and/or predictive storage management devices discussed below.

For example, in the specific embodiment illustrated in FIG. 3 and the examples below, the predictive storage management engine 304 includes a statistical time-series storage device usage sub-engine 304a and a machine-learning storage system usage engine 304b that are each coupled to a storage management sub-engine 304c. As discussed in further detail below, the statistical time-series storage device usage sub-engine 304a may be provided by instructions that are included on the memory system and that, when executed by the processing system, cause the processing system to utilize storage device usage data generated by a storage device(s) included in the storage system 208 discussed above with reference to FIG. 2 to generate storage device usage trend models for those storage device. In a specific example, the statistical time-series storage device usage sub-engine 304a may implement an AutoRegressive Integrated Moving Average (ARIMA) time series model, although other statistical models will fall within the scope of the present disclosure as well.

As discussed in further detail below, the machine-learning storage system usage engine 304b may be provided by instructions that are included on the memory system and that, when executed by the processing system, cause the processing system to utilize storage system implementation information from the storage system 208 discussed above with reference to FIG. 2 to generate storage system implementation models for storage devices under consideration. In a specific example, the machine-learning storage system usage engine 304b may implement a k-means clustering machine learning algorithm, although other machine learning algorithms will fall within the scope of the present disclosure as well. As discussed in further detail below, the storage management sub-engine 304c may be provided by instructions that are included on the memory system and that, when executed by the processing system, cause the processing system to analyze storage device usage trend models and storage system implementation models generated for storage devices to predict future usage of those storage devices, and perform management actions associated with the storage devices based on the predicted future usage of those storage devices.

The chassis 302 may also house a storage system (not illustrated, but which may include the storage 108 discussed above with reference to FIG. 1) that is coupled to the predictive storage management engine 304 (e.g., via a coupling between the storage system and the processing system) and that includes a predictive storage management database 306 that is configured to store any of the information utilized by the predictive storage management engine 304 discussed below. The chassis 302 may also house a communication system 308 that is coupled to the predictive storage management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific predictive storage management device 300 has been illustrated, one of skill in the art in possession of the present disclosure will recognize that predictive storage management devices (or other devices operating according to the teachings of the present disclosure in a manner similar to that described below for the predictive storage management device 300) may include a variety of components and/or component configurations for providing conventional functionality, as well as the functionality discussed below, while remaining within the scope of the present disclosure as well.

Figure 4:
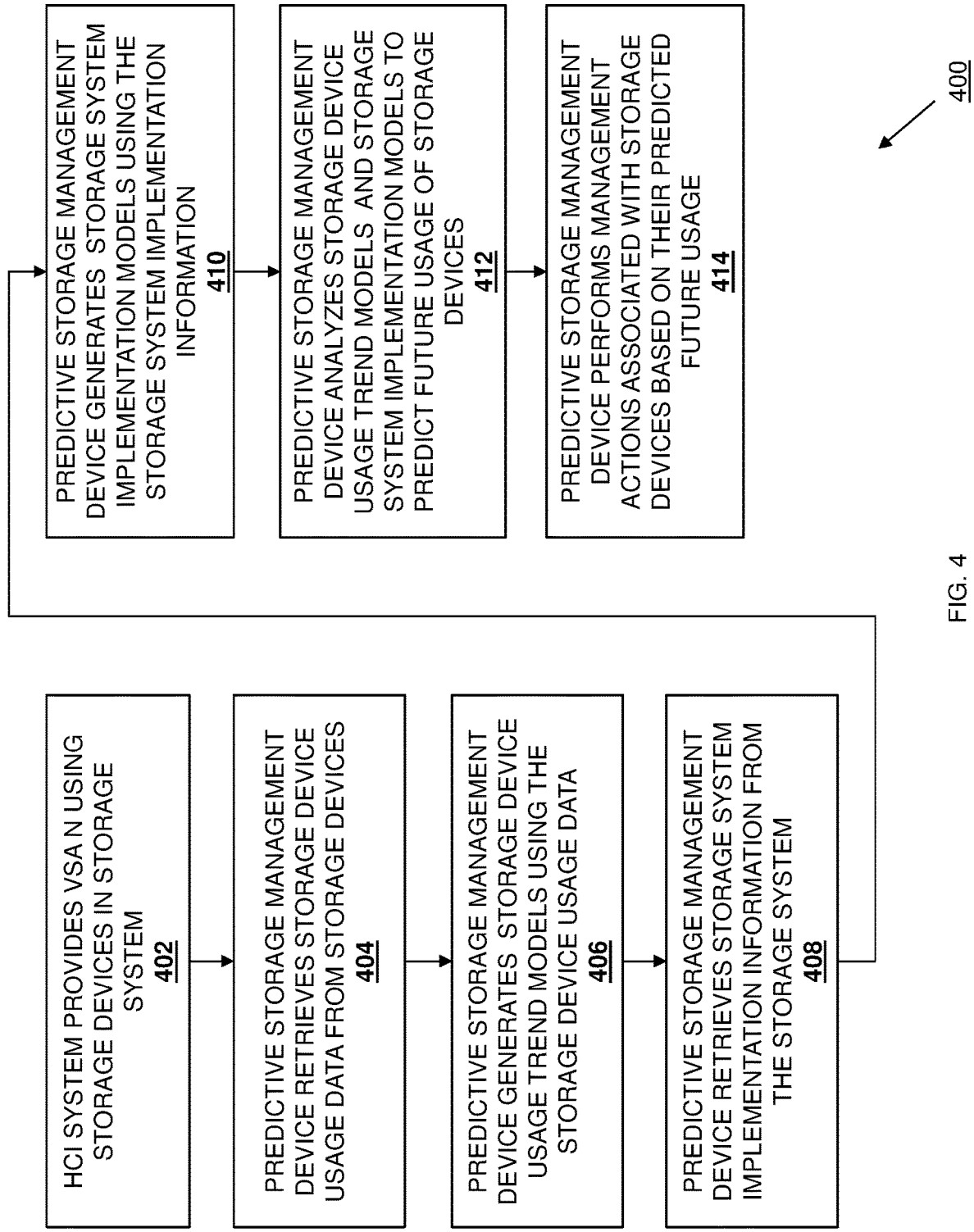
FIG. 4 is a flow chart illustrating an embodiment of a method for predictively managing storage devices.

Referring now to FIG. 4, an embodiment of a method 400 for predictively managing storage devices is illustrated. As discussed below, embodiments of the systems and methods of the present disclosure provide for the generation of historical storage device usage trend models using storage device usage data generated from the historical usage of a storage device in a storage system, as well as the generation of storage system implementation models by a machine learning subsystem that uses storage system implementation information based on specific implementations of the storage systems/storage devices to automatically classify storage capacity requirements for a storage system, in order to perform statistical future usage predictions for any particular storage device (or a plurality of storage devices) based on the historical storage device usage trends model for that storage device along with the storage system implementation model for the storage system in which that storage device is included. As such, management actions may be performed on the storage system/storage devices based on the statistical future usage predictions, which have been found to result in more accurate storage capacity provisioning actions relative to conventional storage management systems.

The method 400 begins at block 402 where an HCI system provides a virtual Storage Area Network (vSAN) using storage devices in a storage system. In an embodiment, at block 402, the HCI system 206 may operate to utilize the storage devices 208a, 208b, and up to 208c in the storage system 208 to provide a vSAN in order to, for example, virtualize the storage provided by a plurality of server devices that are providing the HCI system 206, and allocate that storage to workloads (not illustrated) that, as discussed above, may be provided by the HCI system 206 and/or provided outside the HCI system 206. As would be appreciated by one of skill in the art in possession of the present disclosure, at or prior to block 402, the HCI system 206 may be configured in a particular manner in order to implement the storage system in particular ways that allow for the provisioning of the vSAN at block 402. For example, the storage system 208 may be configured according to a vSAN storage policy that provides the storage devices 208a-208c in a Redundant Array of Independent Disks (RAID) configuration (e.g., a RAID 1 configuration, a RAID 5 configuration, a RAID 6 configuration, etc.). In another example, the storage system 208 may be configured according to a vSAN storage policy that provides the storage devices 208a-208c and/or the storage system 208 with a particular failure tolerance configuration. In yet another example, the HCI system 206 may be configured with a particular number of server devices (e.g., "host" devices) that will operate to provide the storage system 208/vSAN. In yet another example, the storage devices 208a-208c in the storage system 208 may be provided using particular storage device types, including Hard Disk Drives (HDDs), Solid State Drives (SSDs) such as Non-Volatile Memory express (NVMe) SSDs, memory devices (e.g., Storage Class Memory (SCM) devices), etc. However, while a few specific examples of HCI/storage system configurations have been described, one of skill in the art in possession of the present disclosure will recognize that HCI systems may be configured in a variety of manners that will fall within the scope of the present disclosure as well.

Furthermore, in operating to provide the storage system 208 for use by workloads, HCI system 206 may implement the storage system in particular ways that allow for the provisioning of the vSAN at block 402. For example, during the operation of the storage system 208 in providing the vSAN, the storage devices 208a-208c in the storage system 208 may perform Input/Output operations, which may be measured using a benchmark referred to as Input/output Operations Per Second (IOPS) that may be measure for the storage devices individually, and/or for the storage system as a whole. In another example, during operation of the storage system 208 in providing the vSAN, subsets of the storage devices 208a-208c (and/or portions of those storage devices) in the storage system 208 may operate as a cache for the storage system 208/vSAN, and may result in a cache disk capacity/cache-to-capacity-ratio for the storage system 208. In yet another example, during operation of the storage system 208 in providing the vSAN, particular numbers of virtual machines (e.g., provided by the HCI system 206 and/or provided outside the HCI system 206) may operate to utilize the storage system 208/vSAN. However, while a few specific examples of HCI system operation implementations have been described, one of skill in the art in possession of the present disclosure will recognize that HCI systems may be implemented for operation in a variety of manners that will fall within the scope of the present disclosure as well.

Figure 5:
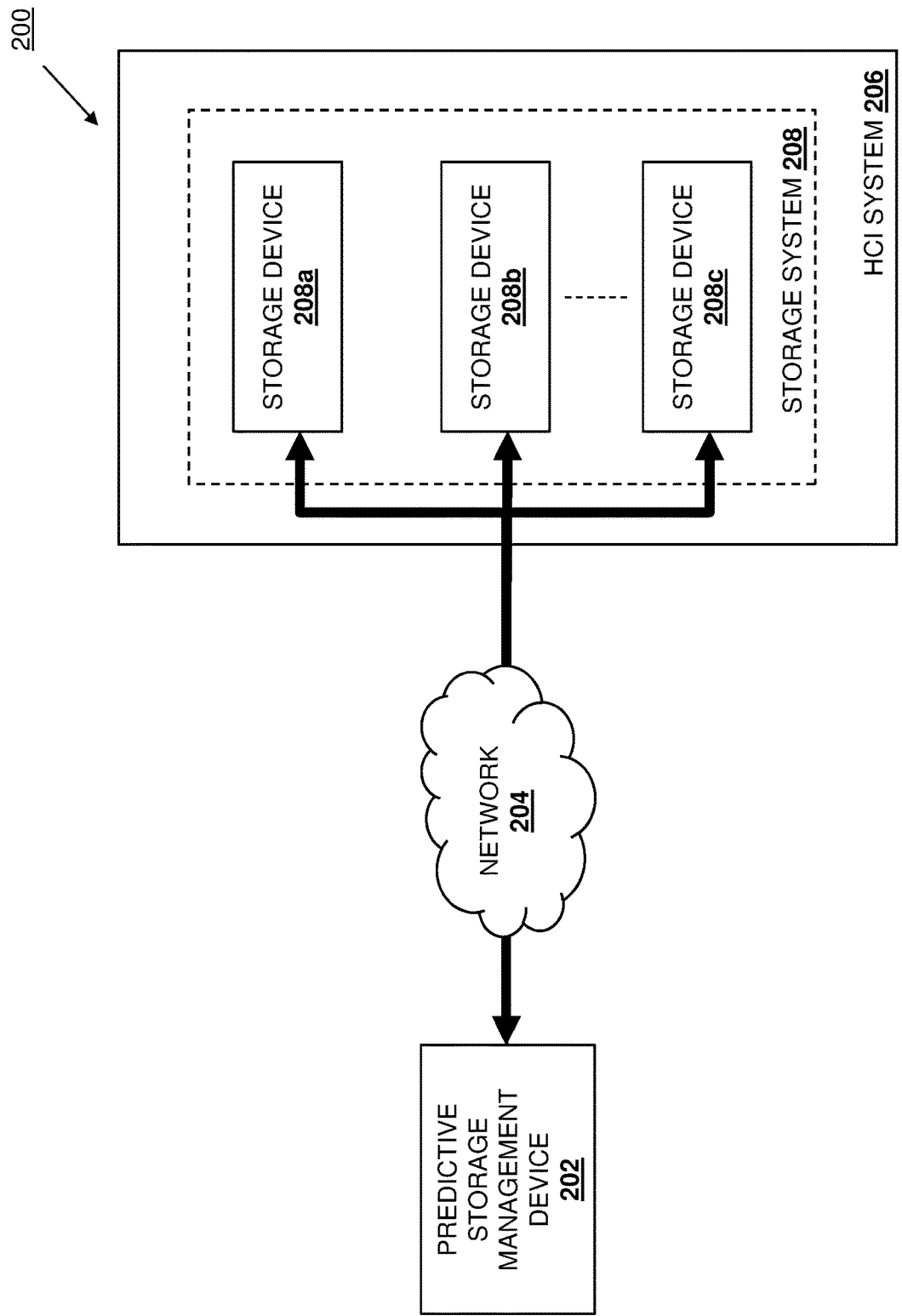
FIG. 5 is a schematic view illustrating an embodiment of the predictive storage management system of FIG. 2 operating during the method of FIG. 4.
Figure 6:
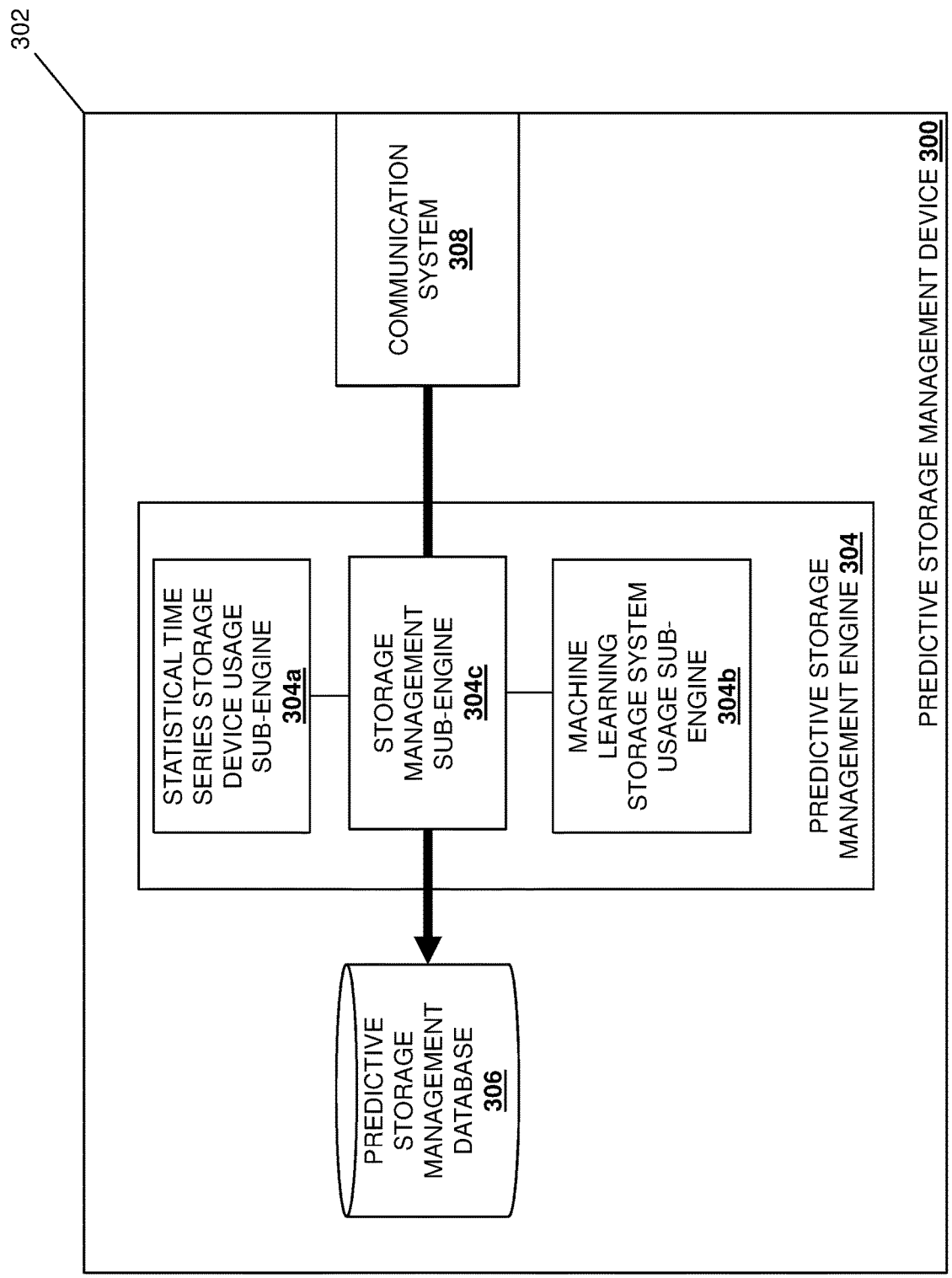
FIG. 6 is a schematic view illustrating an embodiment of the predictive storage management device of FIG. 3 operating during the method of FIG. 4.

The method 400 then proceeds to block 404 where a predictive storage management device retrieves storage device usage data from storage devices. In an embodiment, at block 404, the predictive storage management engine 304 in the predictive storage management device 300 may operate to retrieve (e.g., "pull") storage device usage data generated by the storage devices 208a, 208b, and/or 208c. However, in embodiments in which the storage devices 208a, 208b, and/or 208c are provided with appropriate functionality, at block 404 the storage devices 208a, 208b, and/or 208c may operate to provide (e.g., "push") their storage device usage data to the predictive storage management engine 304 in the predictive storage management device 300. For example, FIG. 5 illustrates the predictive storage management device 202 retrieving (or being provided) storage device usage data from each of the storage devices 208a, 208b, and/or 208c in the storage system 208, while FIG. 6 illustrates the storage management sub-engine 304c in the predictive storage management engine 304 receiving that storage device usage data via the communication system 308, and providing the storage device usage data for storage in the predictive storage management database 306. In some embodiments, the "retrieval" of storage device usage data may include the monitoring of the operations of the storage devices, and the recording of storage device usage data associated with those operations in the predictive storage management database 306. As such, previous usage of any of the storage devices 208a-208c may be collected in the predictive storage management database 306 in a variety of manners that will fall within the scope of the present disclosure.

While the predictive storage management engine 304 in the predictive storage management device 300 is illustrated and described as retrieving/receiving storage device usage data from each of the storage devices 208a-208c in the storage system 208 at the same time, one of skill in the art in possession of the present disclosure will recognize that the predictive storage management engine 304 in the predictive storage management device 300 may retrieve/receive storage device usage data from any one of the storage devices 208a-208c in the storage system 208, or from any combination of the storage devices 208a-208c in the storage system 208, while remaining within the scope of the present disclosure. Furthermore, the collection of storage device usage data by the predictive storage management engine 304 in the predictive storage management device 300 may be performed continuously, periodically (e.g., on a schedule), at the request of an administrator or other HCI system user/provider, and/or in any other manner that would be apparent to one of skill in the art in possession of the present disclosure. In particular, storage device usage data will often be collected over some time period for use in generating he storage device usage trend models discussed below, and thus the retrieval of the storage device usage data at block 404 may be performed multiple times before proceeding to block 406. In the examples provided below, a future usage of the storage device 208a is predicted and, as such, at block 404 the predictive storage management engine 304 in the predictive storage management device 300 may retrieve/receive storage device usage data from the storage devices 208a. However, one of skill in the art in possession of the present disclosure will recognize that the method 400 may be performed for all of the storage devices 208a-208c, or any combination of the storage devices 208a-208c, while remaining within the scope of the present disclosure as well.

The storage device usage data retrieved/received by the predictive storage management engine 304 in the predictive storage management device 300 at block 404 may include any historical storage device usage data generated by the storage devices 208a, 208b, and/or 208c. As such, storage device usage data retrieved/received by the predictive storage management engine 304 in the predictive storage management device 300 at block 404 for the storage device 208a may include a current available storage capacity for the storage device 208a, a history of storage capacity use for the storage device 208a, and/or other historical storage device usage data that would be apparent to one of skill in the art in possession of the present disclosure. However, while a few specific examples have been described, one of skill in the art in possession of the present disclosure will recognize that a variety of storage device usage data will fall within the scope of the present disclosure as well.

Figure 7:
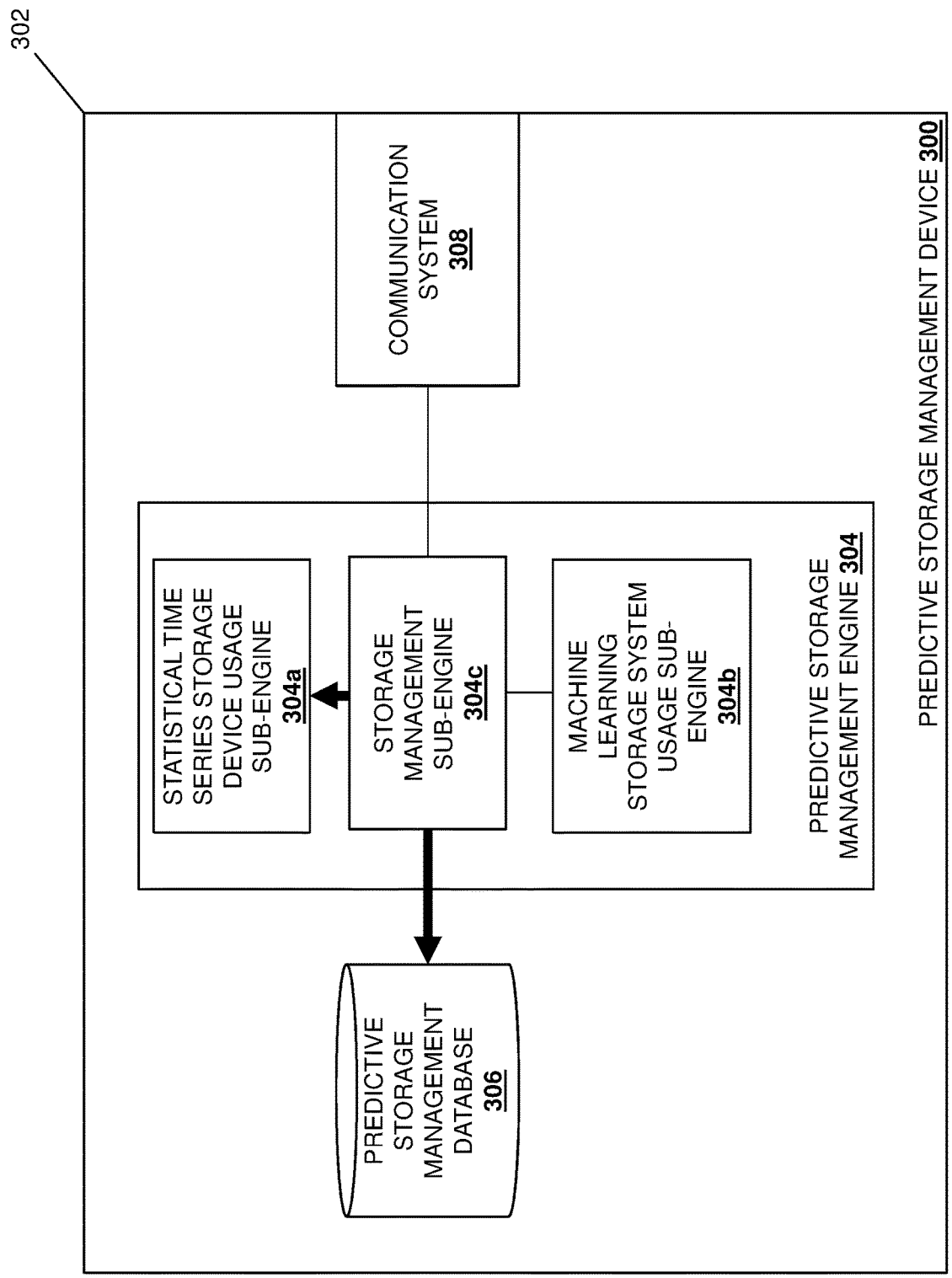
FIG. 7 is a schematic view illustrating an embodiment of the predictive storage management device of FIG. 3 operating during the method of FIG. 4.

The method 400 then proceeds to block 406 where the predictive storage management device generates storage device usage trend models using the storage device usage data. In several embodiments, block 406 (as well as block 410 discussed below) may be performed in order to predict future usage of a particular one of the storage devices 208a, 208b, and up to 208c in the storage system 208. As such, block 406 (and in some cases, block 404) may be performed continuously, periodically (e.g., on a schedule), at the request of an administrator or other HCI system user/provider, and/or in any other manner that would be apparent to one of skill in the art in possession of the present disclosure. Continuing with the example provided above, in an embodiment of block 406 and as illustrated in FIG. 7, the statistical time-series storage device usage sub-engine 304a in the predictive storage management engine 304 may operate to access the storage device usage data stored in the predictive storage management database 306 for the storage device 208a, and use that storage device usage data to generate a storage device usage trend model for the storage device 208a. However, as discussed above, one of skill in the art in possession of the present disclosure will recognize that the method 400 may be performed for all of the storage devices 208a-208c, or any combination of the storage devices 208a-208c, while remaining within the scope of the present disclosure as well In a specific, simplified example, the statistical time-series storage device usage sub-engine 304a may utilize an ARIMA model with the storage device usage data accessed in the predictive storage management database 306 that includes historical storage capacity usage by the storage device 208a. The use of the ARIMA model may include (in effect) plotting data points included in the storage device usage data that detail different levels of historical storage capacity usage by the storage device 208a, and then fitting a line to those plotted data points and extrapolating out that line, which one of skill in the art in possession of the present disclosure will recognize is similar to the manner in which conventional storage management systems attempt to predict future storage usage. As discussed below, the generation and use of the storage system implementation models of the present disclosure along with such storage device usage trend models has been found to greatly enhance such predictions of future storage device usage. However, while a particular, simplified storage device usage trend model has been described, one of skill in the art in possession of the present disclosure will recognize that the storage system implementation models discussed below may be utilized with any of a variety of conventional storage device usage trend models while still providing the benefits discussed below, and thus will fall within the scope of the present disclosure as well. As will be appreciated by one of skill in the art in possession of the present disclosure, an ARIMA model is a generalization of an AutoRegressive Moving Average (ARMA) model, and both models are fitted to time series data to either better understand the data or to predict future points in the time series to provide forecasting. However, ARIMA models may be applied in some cases where data show evidence of non-stationarity, where an initial differencing step (corresponding to the "integrated" part of the model) can be applied one or more times to eliminate the non-stationarity.

The method 400 then proceeds to block 408 where the predictive storage management device retrieves storage system implementation information from the storage system. In an embodiment, at block 408, the predictive storage management engine 304 in the predictive storage management device 300 may operate to retrieve (e.g., "pull") storage system implementation information about the storage system 208. However, in embodiments in which the storage system 208 is provided with appropriate functionality, at block 404 the storage system 208 may operate to provide (e.g., "push") storage system implementation information to the predictive storage management engine 304 in the predictive storage management device 300. For example, FIG. 5 illustrates the predictive storage management device 202 retrieving (or being provided) storage system implementation information from the storage system 208, while FIG. 6 illustrates the storage management sub-engine 304c in the predictive storage management engine 304 receiving that storage system implementation information via the communication system 308, and providing the storage system implementation information for storage in the predictive storage management database 306.

The collection of storage system implementation information by the predictive storage management engine 304 in the predictive storage management device 300 may be performed continuously, periodically (e.g., on a schedule), at the request of an administrator or other HCI system user/provider, and/or in any other manner that would be apparent to one of skill in the art in possession of the present disclosure. As such, continuing with the example provided above, when a prediction of the future usage of the storage device 208a is to be made, the predictive storage management engine 304 in the predictive storage management device 300 may retrieve/receive the storage system implementation information. However, as discussed above, one of skill in the art in possession of the present disclosure will recognize that the method 400 may be performed for all of the storage devices 208a-208c, or any combination of the storage devices 208a-208c, while remaining within the scope of the present disclosure as well. Furthermore, rather than collecting the storage system implementation information as discussed above, the storage system implementation information may be provided by an administrator and/or other HCI system user (e.g., in the predictive storage management database 306), retrieved from another HCI subsystem (e.g., a remote access controller device, a Baseboard Management Controller (BMC) device, etc.), and/or provided in a variety of manners that will fall within the scope of the present disclosure as well. In some embodiments, the "retrieval" of storage system implementation information may include the monitoring of the operations of the storage system 208, and the recording of storage system implementation information associated with those operations in the predictive storage management database 306. As such, storage system implementation information about the storage system 208 may be collected in the predictive storage management database 306 in a variety of manners that will fall within the scope of the present disclosure.

The storage system implementation information retrieved/received by the predictive storage management engine 304 in the predictive storage management device 300 at block 404 may include any storage system implementation information that describes the storage system 208, the storage devices 208a-208c, and/or the use of the storage system 208/storage devices 208a-208c during their operation. For example, storage system implementation information retrieved/received by the predictive storage management engine 304 in the predictive storage management device 300 at block 404 for the storage system 208 may identify the configuration of the storage system 208 according to a vSAN storage policy that provides the storage devices 208a-208c in a Redundant Array of Independent Disks (RAID) configuration (e.g., a RAID 1 configuration, a RAID 5 configuration, a RAID 6 configuration, etc.), the configuration of the storage system 208 according to a vSAN storage policy that provides the storage devices 208a-208c and/or the storage system 208 with a failure tolerance configuration, the configuration of the HCI system 206 with a particular number of server devices (e.g., "host" devices) that operate to provide the storage system 208/vSAN, the provisioning of storage devices 208a-208c in the storage system 208 using particular storage device types (e.g., HDDs, SSDs such as NVMe SSDs, memory devices (e.g., Storage Class Memory (SCM) devices), as well as any other HCI system/storage system implementation details that would be apparent to one of skill in the art in possession of the present disclosure.)

In some embodiments, storage system implementation information retrieved/received by the predictive storage management engine 304 in the predictive storage management device 300 at block 404 for the storage system 208 may identify IOPS measurements for the storage devices 208a-208c and/or the storage system 208, subsets of the storage devices 208a-208c (and/or portions of those storage devices 208a-208c) in the storage system 208 that operate as a cache for the storage system 208/vSAN, a cache disk capacity/cache-to-capacity-ratio for the storage system 208, a number of virtual machines operating to utilize the storage system 208/vSAN, a vSAN storage Primary level of Failures To Tolerare (PFTT), a vSAN storage failure tolerance method (e.g., a RAID 1/5/6 method), as well as any other HCI system/storage system implementation details that would be apparent to one of skill in the art in possession of the present disclosure.

Figure 8:
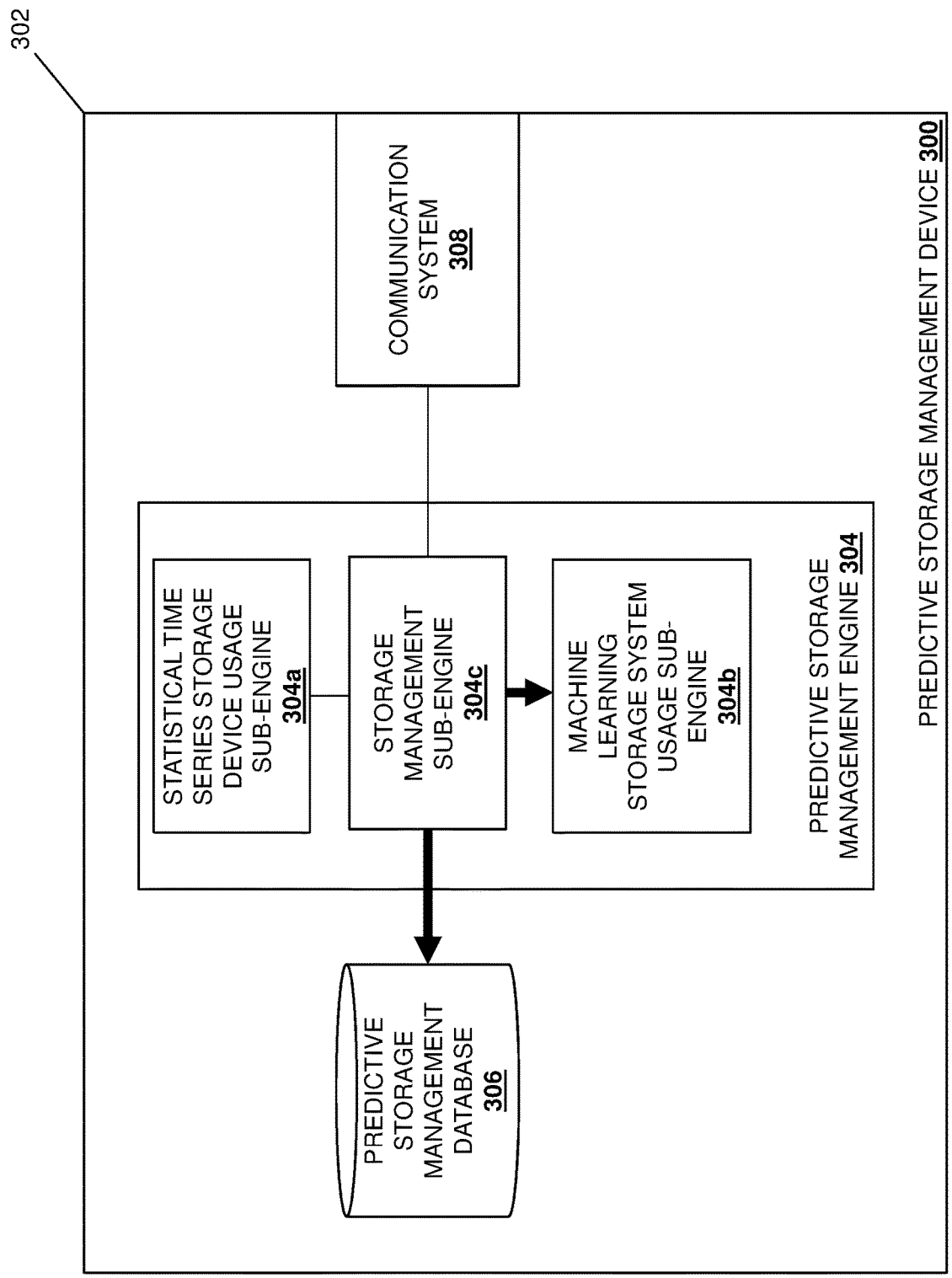
FIG. 8 is a schematic view illustrating an embodiment of the predictive storage management device of FIG. 3 operating during the method of FIG. 4.

The method 400 then proceeds to block 410 where the predictive storage management device generates storage system implementation models using the storage system implementation information. As discussed above, block 410 (as well as block 406) may be performed in order to predict future usage of a particular one of the storage devices 208a, 208b, and up to 208c in the storage system 208. As such, block 410 (and in some cases, block 408) may be performed continuously, periodically (e.g., on a schedule), at the request of an administrator or other HCI system user/provider, and/or in any other manner that would be apparent to one of skill in the art in possession of the present disclosure. Continuing with the example above, in an embodiment of block 410 and as illustrated in FIG. 8, the machine-learning storage subsystem usage sub-engine 304b in the predictive storage management engine 304 may operate to access the storage system implementation information stored in the predictive storage management database 306 for the storage system 208 that includes the storage device 208a, and use that storage system implementation information to generate a storage system implementation model for the storage system 208. However, as discussed above, one of skill in the art in possession of the present disclosure will recognize that the method 400 may be performed for all of the storage devices 208a-208c, or any combination of the storage devices 208a-208c, while remaining within the scope of the present disclosure as well.

In a specific, simplified example, the machine-learning storage subsystem usage sub-engine 304b may implement a k-means clustering machine learning algorithm with the storage system implementation information accessed in the predictive storage management database 306 that includes storage system implementation details for the storage system 208 that includes the storage device 208a. As such, the machine-learning storage subsystem usage sub-engine 304b may utilize particular storage system implementation information such as, for example, a storage device type of the storage device 208a, a number of server devices that are utilized to provide the storage system 208, IOPS measurements for the storage devices 208a-208c and/or the storage system 208, subsets of the storage devices 208a-208c (and/or portions of those storage devices 208a-208c) in the storage system 208 that operate as a cache for the storage system 208/vSAN, a cache disk capacity/cache-to-capacity-ratio for the storage system 208, a number of virtual machines operating to utilize the storage system 208/vSAN, as well as any other HCI system/storage system implementation details that would be apparent to one of skill in the art in possession of the present disclosure for identifying how those HCI system/storage system implementation details have effected the operation of the storage device 208a.

As will be appreciated by one of skill in the art in possession of the present disclosure, the use of machine learning algorithms such as the k-means clustering machine learning algorithm discussed above may include the processing of data generated by the storage system 208 (as well as other storage systems) in order to identify storage system characteristics that influence the use and/or behavior of storage devices, and the subsequent generation of a storage implementation model that may be applied to a particular storage device to determine storage capacity use trends that are based on the use of that storage device in a particular storage system implementation. As such, the storage system implementation model may be generated from storage system characteristics for storage devices provided by particular storage device types (e.g., HDDs, SDDs, memory devices, etc.), storage system characteristics for IOPS measurements for storage devices and/or storage systems, storage system characteristics for storage devices (and/or portions of storage devices) in a storage system that operate as a cache for the storage system, storage system characteristics for storage systems with particular cache disk capacities/cache-to-capacity-ratios, storage system characteristics for storage systems utilized by particular numbers of virtual machines, storage system characteristics for storage systems provided by particular numbers of server devices, and/or any other storage system characteristics that would be apparent to one of skill in the art in possession of the present disclosure. Thus, one of skill in the art in possession of the present disclosure will recognize that the storage system implementation model generated at block 410 and/or utilized below may be specific to the storage system implementation for the storage system 208 and its storage device 208a for which a future usage is being predicted. However, while a particular, simplified storage system implementation model has been described, one of skill in the art in possession of the present disclosure will recognize that other storage system implementation models may be utilized with any the storage device usage trend models discussed above while still providing the benefits of the present disclosure, and thus will fall within its scope as well.

Figure 9:
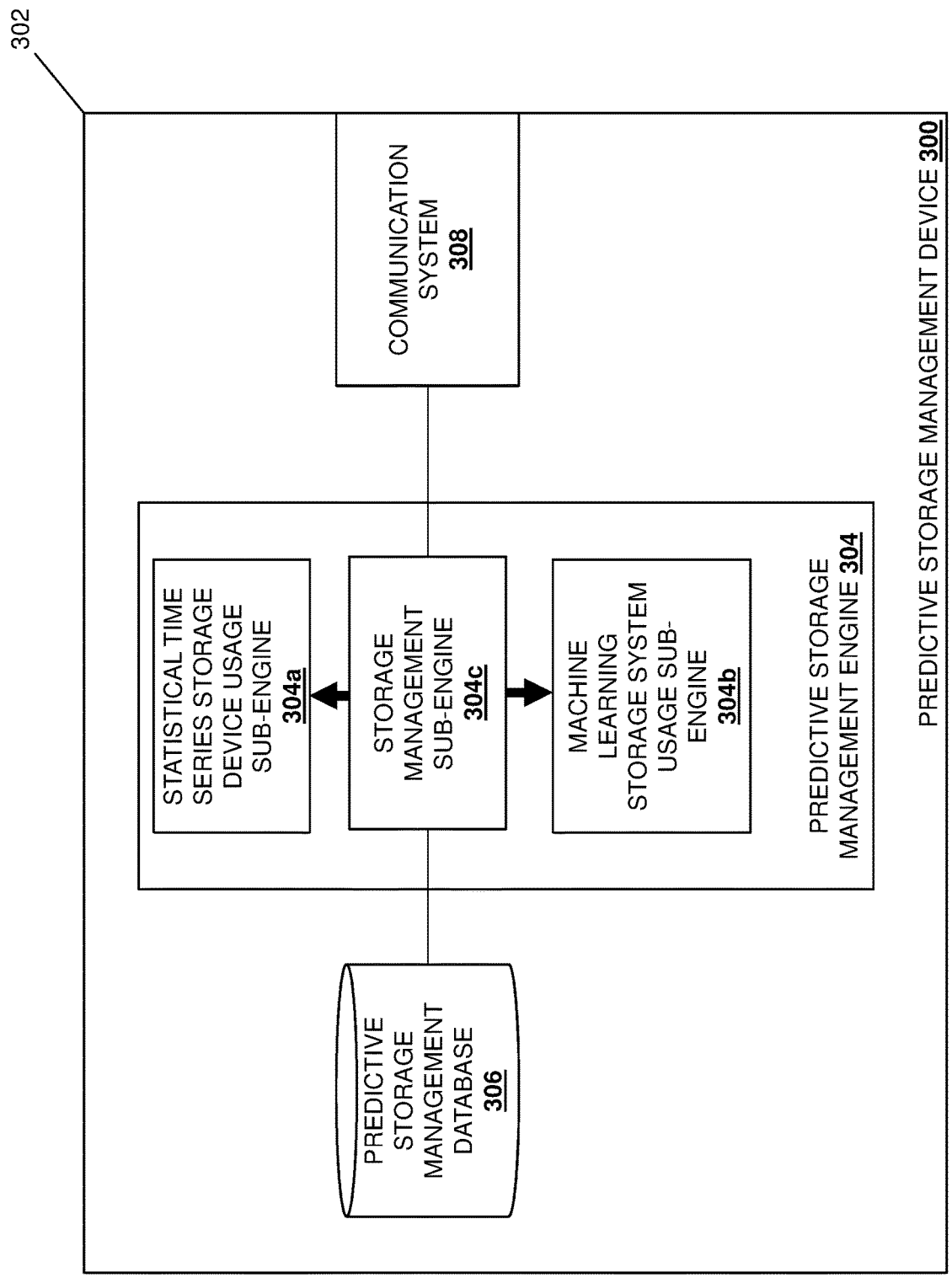
FIG. 9 is a schematic view illustrating an embodiment of the predictive storage management device of FIG. 3 operating during the method of FIG. 4.

The method 400 then proceeds to block 412 where the predictive storage management device analyzes the storage device usage trend models and the storage system implementation models to predict future usage of the storage device. Continuing with the example discussed above, in an embodiment of block 412 and as illustrated in FIG. 9, the storage management sub-engine 304c may operate to analyze the storage device usage trend model generated by the statistical time series storage device usage sub-engine 304a for the storage device 208a at block 406, along with the storage system implementation model generated by the machine-learning storage system usage sub-engine 304b that is specific to the storage system implementation of the storage system 208 and its storage device 208a and, in response, predict a future usage of the storage device 208a. However, as discussed above, one of skill in the art in possession of the present disclosure will recognize that the method 400 may be performed for all of the storage devices 208a-208c, or any combination of the storage devices 208a-208c, while remaining within the scope of the present disclosure as well. A few specific examples of the analysis at block 412 and its results are described below, but one of skill in the art in possession of the present disclosure will recognize that the techniques of the present disclosure may be utilized to predict future usages of a storage device based on its historical usage trends and a variety of implementation details for that storage device and/or its storage system while remaining within the scope of the present disclosure as well.

In one example, the storage device 208a may be provided by an SSD (e.g., an NVMe storage device) and, at block 412, the analysis of the storage device usage trend model for the storage device 208a and the storage system implementation model for the storage device 208a and the storage system 208 may utilize the historical storage device usage data in the storage device usage trend model for the storage device 208a, along with the storage system implementation model that provides machine-learned storage device usage trends for SSDs and, in particular embodiments, SSDs similar to the storage device 208a such as NVMe storage devices provided in storage systems similar to the storage system 208. The consideration of the machine-learned storage device usage trends for SSDs allows for an SSD/storage-system-specific extrapolation of the historical storage device usage data for the storage device 208a based on SSD/storage-system-specific historical storage device usage trends, which one of skill in the art in possession of the present disclosure will recognize provide for a more accurate extrapolation of the historical storage device usage data for the storage device 208a. For example, while a conventional extrapolation of the historical storage device usage data for the storage device 208a may identify a reduced future storage device usage, SSD/storage-system-specific historical storage device usage trends may be non-linear time-series trends, and the consideration of the SSD-specific historical storage device usage trends may indicate an increased storage device usage for the storage device 208a (e.g., due to a trend of typically moving NVMe storage devices to high usage situations, etc.) In some embodiments, the predicted future usage of the storage device 208a may be classified by level (e.g., "1"—low level predicted future storage device usage, "2"—low intermediate level predicted future storage device usage, "3"—intermediate level predicted future storage device usage, "4"—high intermediate level predicted future storage device usage, and "5" high level predicted future storage device usage).

In another example, the storage device 208a may be utilized as a cache in the storage system 208 and, at block 412, the analysis of the storage device usage trend model for the storage device 208a and the storage system implementation model for the storage device 208a and the storage system 208 may utilize the historical storage device usage data in the storage device usage trend model for the storage device 208a, along with the storage system implementation model that provides machine-learned storage device usage trends for storage devices utilized as caches. The consideration of the machine-learned storage device usage trends for storage devices utilized as caches allows for an cache-specific extrapolation of the historical storage device usage data for the storage device 208a based on cache-specific historical storage device usage trends, which one of skill in the art in possession of the present disclosure will recognize provide for a more accurate extrapolation of the historical storage device usage data for the storage device 208a. For example, while a conventional extrapolation of the historical storage device usage data for the storage device 208a may identify an increased future storage device usage, cache-specific historical storage device usage trends may be non-linear time-series trends, and the consideration of the cache-specific historical storage device usage trends may indicate an unchanged storage device usage for the storage device 208a (e.g., a relatively high utilization of the storage capacity of the storage device 208a may be steady in the future because that storage device is providing a cache that will not need increased storage capacity.) As discussed above, the predicted future usage of the storage device 208a may be classified by level (e.g., "1"—low level predicted future storage device usage, "2"—low intermediate level predicted future storage device usage, "3"—intermediate level predicted future storage device usage, "4"—high intermediate level predicted future storage device usage, and "5" high level predicted future storage device usage).

While a few simplified, specific examples have been described, one of skill in the art in possession of the present disclosure will recognize that combinations of different storage system implementation information (e.g., the storage-device-type-specific usage trends and the cache-specific usage trends, as well as any other storage system implementation information discussed herein) may be considered to predict the future usage of a storage device. As such, expanding on the examples above, historical storage device usage trends for SSDs that have been utilized as a cache may be considered with the historical storage device usage data for the storage device 208a in order to predict the future usage of the storage device 208a.

Continuing with the examples provided above, one of skill in the art in possession of the present disclosure will recognize how IOPS trends for storage devices and/or storage systems may be non-linear time-series trends that can be utilized to more accurately extrapolate historical storage device usage data in the storage device usage trend model for the storage device 208a, storage system cache disk capacity/cache-to-capacity-ratio trends may be non-linear time-series trends that can be utilized to more accurately extrapolate historical storage device usage data in the storage device usage trend model for the storage device 208a, virtual machine/storage system utilization trends may be non-linear time-series trends that can be utilized to more accurately extrapolate historical storage device usage data in the storage device usage trend model for the storage device 208a, storage system/server device provisioning trends may be non-linear time-series trends that can be utilized to more accurately extrapolate historical storage device usage data in the storage device usage trend model for the storage device 208a, storage policy trends (e.g., the use of the storage device 208a in a RAID 1, RAID 5, or RAID 6 configuration) may be non-linear time-series trends that can be utilized to more accurately extrapolate historical storage device usage data in the storage device usage trend model for the storage device 208a, and fault tolerance trends may be non-linear time-series trends that can be utilized to more accurately extrapolate historical storage device usage data in the storage device usage trend model for the storage device 208a. Furthermore, administrators and/or HCI system users may provide estimations of future storage capacity usage in the predictive storage management database 306, and those estimations may be utilized with the storage device usage trend models and the storage system implementation models in order to predict the future usage of any particular storage device.

Figure 10:
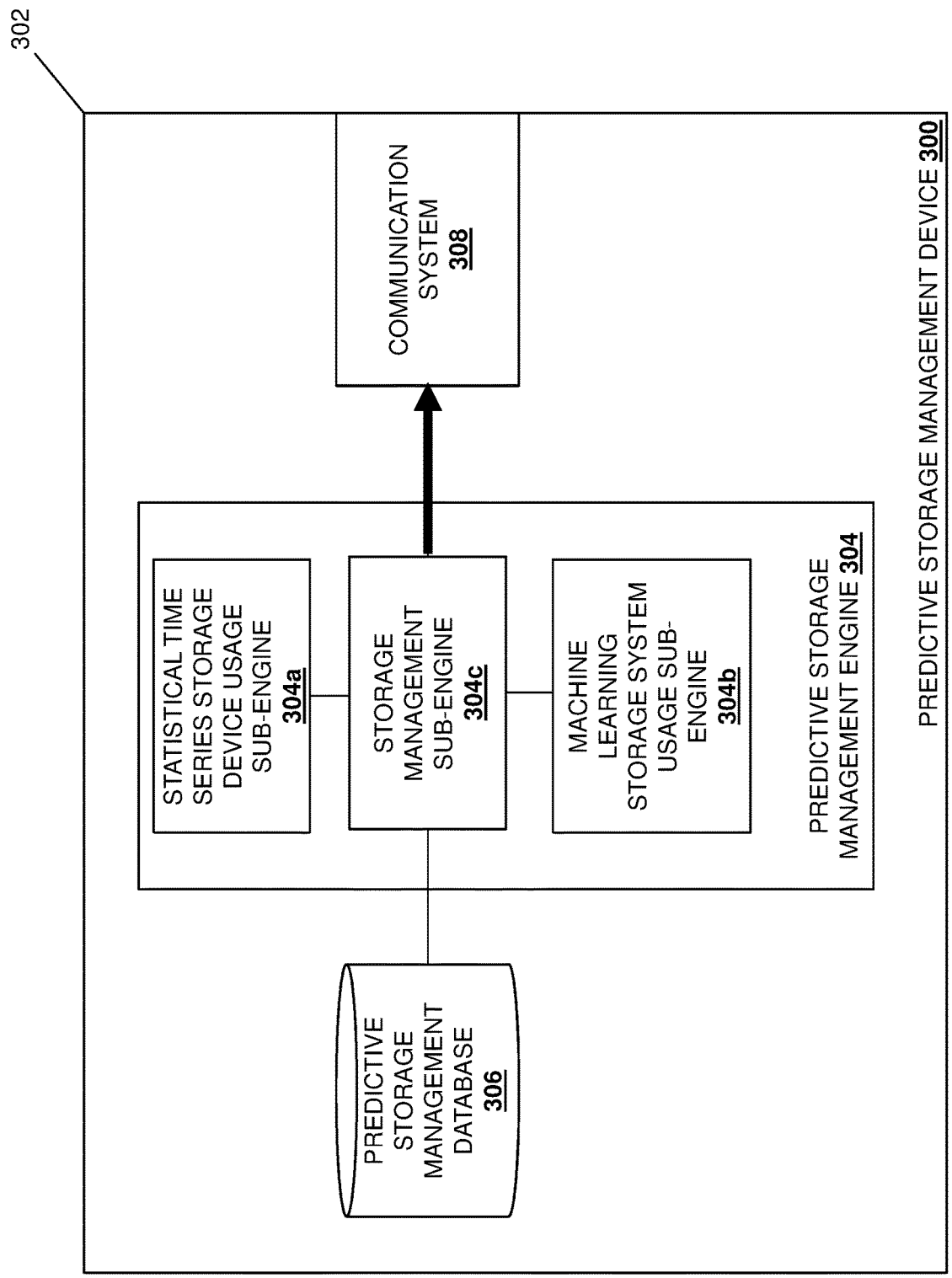
FIG. 10 is a schematic view illustrating an embodiment of the predictive storage management device of FIG. 3 operating during the method of FIG. 4.
Figure 11:
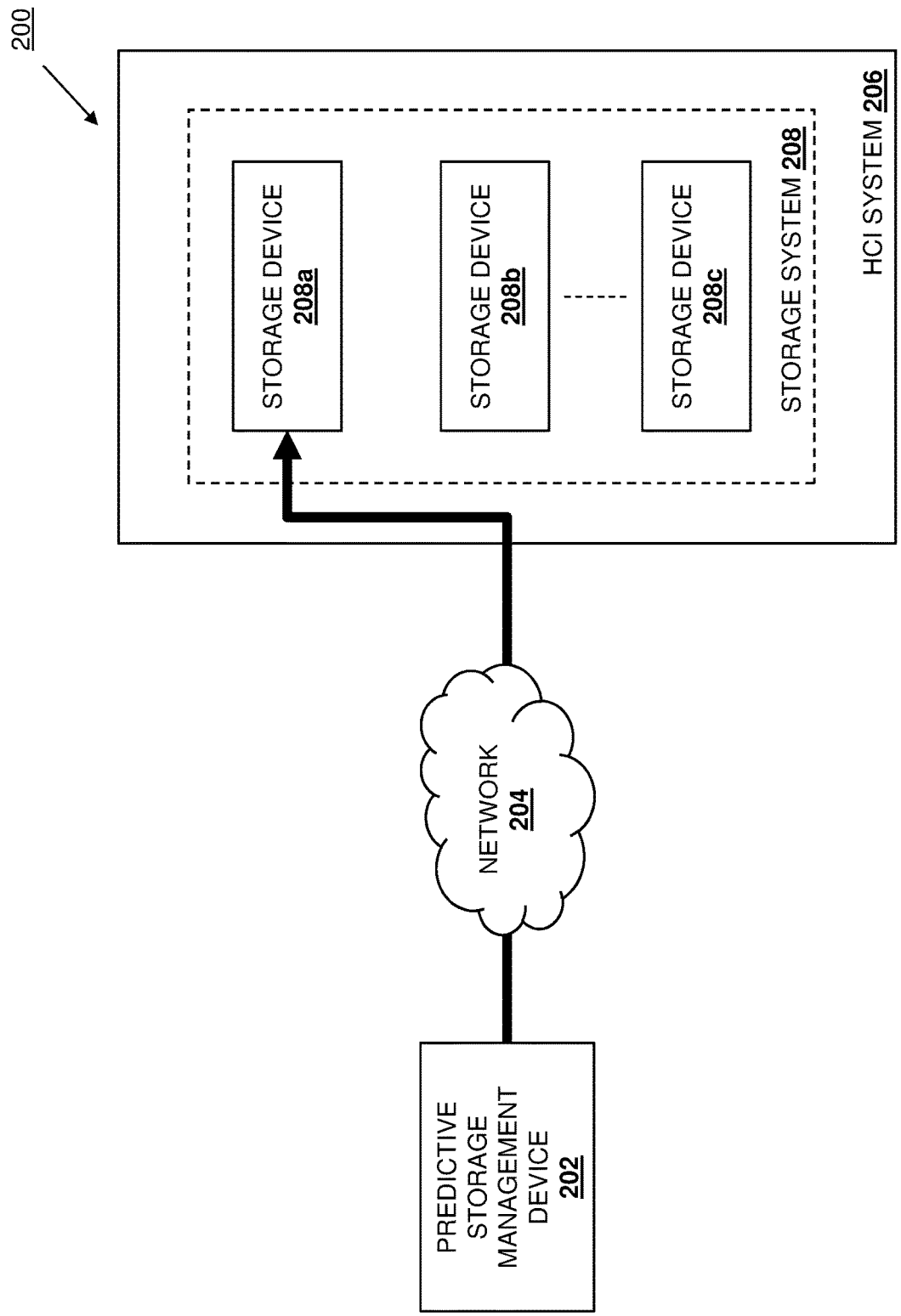
FIG. 11 is a schematic view illustrating an embodiment of the predictive storage management system of FIG. 2 operating during the method of FIG. 4.

The method 400 then proceeds to block 414 where the predictive storage management device performs management actions associated with storage devices based on their predicted future usage. As illustrated in FIGS. 10 and 11, in an embodiment of block 414, the storage management sub-engine 304c in the predictive storage management engine 304 may operate to generate a management action associated with the storage device 208a and, in the illustrated embodiment, send that management engine via its communication engine 308 and through the network 204 to the storage device 208a in the storage system 208. In some examples, the management action sent to the storage device 208a at block 414 may result in data purging operations being performed on the storage device 208a that purge data from the storage device 208a (e.g., in order to clear up storage capacity in the storage device 208a based on an increased predicted future usage of the storage device 208a). In some examples, the management action sent to the storage device 208a at block 414 may result in data defragmentation operations being performed on the storage device 208a that defragment data on the storage device 208a (e.g., in order to clear up storage capacity in the storage device 208a based on an increased predicted future usage of the storage device 208a). In some examples, the management action sent to the storage device 208a at block 414 may result in storage reconfiguration operations being performed on the storage device 208a that reconfigure the storage device 208a for different failure tolerance levels (e.g., in order to clear up storage capacity in the storage device 208a based on an increased predicted future usage of the storage device 208a).

However, while a few specific examples of management actions have been described, one of skill in the art in possession of the present disclosure will recognize that a variety of management actions will fall within the scope of the present disclosure as well, including displaying a message to an administrator or other HCI system user that a decrease in storage capacity utilization for the storage device 208a is predicted, an increase in storage capacity utilization for the storage device 208a is predicted, or no change in storage capacity utilization for the storage device 208a is predicted. Similarly, messages displayed based on the predicted future usage of the storage device 208a may include recommendations to purchase new storage devices because predicted storage capacity utilization of the storage system 208 will increase beyond an available storage capacity of the storage system, recommendations to reduce the number of storage devices in the storage system 208 because predicted storage capacity utilization of the storage system 208 will decrease, and/or any other recommendations that would be apparent to one of skill in the art in possession of the present disclosure.

Thus, systems and methods have been described that provide for the generation of historical storage device usage trends models using storage device usage data generated from the historical usage of a storage device/storage system in an HCI system, as well as the generation of storage system implementation models by a machine learning subsystem that uses storage system implementation information that details the specific implementation of the storage system/storage devices in the HCI system to automatically classify storage capacity requirements for the HCI system storage system, and performing statistical future usage predictions for any number of storage devices in the storage system based on the historical storage device usage trends model for those storage devices along with the storage system implementation model for the storage system in which those storage devices are included. As such, management actions may be performed on the storage system/storage devices based on the statistical future usage predictions generated using storage system implementation details and trends, which have been found to result in more accurate storage capacity provisioning actions relative to conventional storage management systems.

In a specific experimental embodiment, in addition to a core statistical time-series model for calculating historical storage device usage trends, the predictive storage management system of the present disclosure was implemented to consider the following factors:
Hardware drive models and types (HDD/SSD)
Cache disk capacity (cache-to-capacity ratio)
Total number of connected cluster hosts
Total number of virtual machines with their power status or total "zombie" vm counts
Disk IOPS statistics
vSAN storage policy: Primary level of failures to tolerate (PFTT)
vSAN storage policy: Failure tolerance method (RAID-1/RAID-5/6)
vSAN storage policy: Deduplication and Compression settings
Stretched clusters configurations
User vertical classifications
User rough planning on future disk capacity requirement
Application installation types or application behavioral types on virtual machine
Disk quota allocation requests made by users Furthermore, in this experimental embodiment, the predictive storage management system of the present disclosure was configured to utilize some or all of factors listed above to predict and/or infer the following:
Historical disk usage statistical trends
Future disk usage trends and potential disk capacity requirement classifications
capacity provisioning decisions (e.g. when to add or buy more storage devices)

In the experimental embodiment, disk usage time series information was used by a generative statistical time-series model (e.g. ARIMA) to calculate a prediction model for future disk usage trend. For example, the predictive storage management system used the previous two weeks time series of the disk usage data to calculate a model of usage trend predictions for subsequent 10 days. It was found that, as the time series grows, the model could be updated once every day in order to provide for more accurate trends calculation/predictions.

Furthermore, the experimental embodiment indicated that other data feature factors exhibited significant variations in future usage trends, and in order to infer a general model to group different storage capacity requirements, the predictive storage management system of the present disclosure was configured to assemble the following environmental feature factors from a cluster:
Drive models and types—SSD or HDD, all-flash or hybrid
Cache disk capacity size (cache-to-capacity ratio)
Total number of connected cluster hosts
Total number of virtual machines with their power status
Total number of "zombie" virtual machines which can be removed from the cluster
Disk IOPS statistics (assuming IOPS rate is proportional to capacity growth)
vSAN storage policy: Primary level of failures to tolerate (PFTT)
vSAN storage policy: Failure tolerance method (RAID-1/RAID-5/6)
vSAN storage policy: Deduplication and Compression settings
Stretched clusters configurations
User vertical classifications
User rough planning on future disk capacity requirement
Application installation types on virtual machine
Application behavioral types on virtual machine
Disk quota allocation requests made by users The experimental embodiment of the predictive storage management system of the present disclosure was configured to leverage a generative unsupervised machine learning algorithm (e.g. k-means) to classify storage usage pattern into the one of the following 5 capacity requirement groups:
Extra low capacity requirement (Group-1)
Low capacity requirement (Group-2)
Average capacity requirement (Group-3)
High capacity requirement (Group-4)
Extra high capacity requirement (Group-5)

In one example, a storage cluster with large number of virtual machines is likely to exhibit more aggressive disk usage demand than another storage cluster with small number of virtual machines, regardless of how the historical disk usage trend looks like. In another example, vSAN storage policies such as a failure tolerance method configuration with RAID-1 are likely to exhibit more aggressive disk usage demand than the same configuration with RAID-5/6. Furthermore, vSAN Deduplication and Compression options work together to reduce the amount of storage capacity required to store the data. Further still, a users rough estimation on his future capacity requirement as an optional user input signal may also contribute to the overall evaluation of the capacity requirement clustering process. Yet further still, application installation type will also have significant impact on future capacity requirement (e.g. a NoSQL database installation with HA configuration may probably take high capacity demand in future usage.) As such, the predictive storage management system may be configured to aggregate all these environmental metadata features, and then generalize capacity usage requirement groups via the unsupervised machine learning algorithm (e.g., k-means clustering.)

As discussed above, a capacity requirement group may be used to provide a more accurate forecast on future disk usage trends, as two identical historical usage trends may fluctuate with two significantly different usage trends in future. However, when the capacity requirement group is considered, more accurate future capacity provisioning recommendations may be generated. For example, the table below shows the combination of a set of environmental feature factors for one cluster (in each row), with the last column showing the calculated capacity requirement classification results according to the unsupervised machine learning model:

| VSAN POLICY- FAILURE TOLER. METHOD | VSAN POLICY- PFTT | VSAN DEDUP & COMPRESSION | CACHE DISK CAPACITY | NUMBER OF HOSTS | NUMBER OF VMS | IOPS WEEKLY AVERAGE | STRETCHED CLUSTER | CAPACITY REQUIREMENT GROUP |
|---|---|---|---|---|---|---|---|---|
| RAID 5 | 1 | ENABLED | 100 | 3 | 50 | 2340 | N | GROUP 2 |
| RAID 1 | 2 | ENABLED | 200 | 4 | 50 | 1230 | N | GROUP 3 |
| RAID 6 | 1 | ENABLED | 100 | 4 | 45 | 1289 | N | GROUP 2 |
| RAID 6 | 2 | ENABLED | 200 | 7 | 80 | 2200 | N | GROUP 2 |
| RAID 5 | 3 | ENABLED | 200 | 5 | 45 | 2802 | N | GROUP 3 |
| RAID 5 | 1 | ENABLED | 100 | 5 | 120 | 1234 | N | GROUP 2 |
| RAID 1 | 2 | DISABLED | 150 | 12 | 223 | 1230 | Y | GROUP 4 |
| RAID 1 | 1 | DISABLED | 150 | 5 | 70 | 1502 | N | GROUP 5 |

As discussed above, the predictive storage management system of the present disclosure may provide different decision making recommendations based on capacity provisioning to users according to the combined prediction results of time series usage trend and capacity requirement group. The decision making recommendation can indicate to the user when to buy or add new drive nodes in a timely fashion or provide storage reclamation recommendation if applicable. As such, a specific example of a final decision making recommendation might be "Aggressive usage pattern with high capacity requirement detected: Storage is estimated to be used up within one month. Consider to buy new drives with at least 500 GB capacity".

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A predictive storage management system, comprising:
a first storage system including a plurality of storage devices; and
a predictive storage management device that is coupled to the first storage system via a network, wherein the predictive storage management device includes:
a statistical time-series storage device usage sub-engine that is configured to:
retrieve first storage device usage data from a first storage device that is included in the plurality of storage devices in the first storage system and that is a first type of storage device; and
generate, using the first storage device usage data, a first storage device usage trend model;
a machine-learning storage system usage sub-engine that is configured to:
retrieve first storage system implementation information from the first storage system; and
generate, using 1) the first storage system implementation information, 2) second storage system implementation information from at least one second storages system that is implemented the same as the first storage system and that includes a second storage device that is the first type of storage device, and 3) an unsupervised machine learning model, a storage system implementation model that identifies storage system characteristics that influence at least one of a use or a behavior of a storage device that is the first type of storage device and that is included in a storage system that is implemented the same as the first storage system and the second storage system; and
a storage management sub-engine that is configured to:
extrapolate the first storage device usage data in the first storage device usage trend model with nonlinear time-series trends included in the storage system implementation model to determine a predicted future usage of the first storage device; and
perform, based on the predicted future usage of the first storage device, a management action associated with the first storage device.

2. The system of claim 1, further comprising:
a Hyper-Converged Infrastructure (HCI) system that includes the first storage system and that is configured to utilize the first storage system to provide a virtualized Storage Area Network (vSAN).

3. The system of claim 1, wherein the first storage system implementation information identifies a configuration of the plurality of storage devices in the first storage system.

4. The system of claim 1, wherein the first storage system implementation information identifies a cache storage device capacity for the first storage system.

5. The system of claim 1, wherein the first storage system implementation information identifies a number of server devices used to provide the first storage system.

6. The system of claim 1, wherein the first storage system implementation information identifies a number of virtual machines utilizing the first storage system.

7. An Information Handling System (IHS), comprising:
a processing system; and
a memory system that is coupled to the processing system and that includes instructions that, when executed by the processing system, cause the processing system to provide a predictive storage management engine that is configured to:
retrieve first storage device usage data from a first storage device that is included in a first storage system and that is a first type of storage device;
generate, using the first storage device usage data, a first storage device usage trend model;
retrieve first storage system implementation information from the first storage system;
generate, using 1) the first storage system implementation information, 2 second storage system implementation information from at least one second storage system that is implemented the same as the first storage system and that includes a second storage device that is the first type of storage device, and 3) an unsupervised machine learning model, a storage system implementation model that identifies storage system characteristics that influence at least one of a use or a behavior of a storage device that is the first type of storage device and that is included in a storage system that is implemented the same as the first storage system and the second storage system;
extrapolate the first storage device usage data in the first storage device usage trend model with non-linear time-series trends included in the storage system implementation model to determine a predicted future usage of the first storage device; and
perform, based on the predicted future usage of the first storage device, a management action associated with the first storage device.

8. The IHS of claim 7, wherein the first storage system is included in a Hyper-Converged Infrastructure (HCI) system and provide as a virtualized Storage Area Network (vSAN) by the HCI system.

9. The IHS of claim 7, wherein the first storage system implementation information identifies a configuration of the plurality of storage devices in the first storage system.

10. The IHS of claim 7, wherein the first storage system implementation information identifies a cache storage device capacity for the first storage system.

11. The IHS of claim 7, wherein the first storage system implementation information identifies a number of server devices used to provide the first storage system.

12. The IHS of claim 7, wherein the first storage system implementation information identifies a number of virtual machines utilizing the first storage system.

13. The IHS of claim 7, wherein the management action associated with the first storage device includes at least one of:
a data purging operation that is performed on the first storage device and that purges data from the first storage device;
a data defragmentation operation that is performed on the first storage device and that defragments data on the first storage device; and
a storage reconfiguration operation that is performed on the first storage device and that reconfigures the first storage device.

14. A method for predictively managing storage devices, comprising:
retrieving, by a predictive storage management device from a first storage device that is included in a first storage system and that is a first type of storage device, first storage device usage data;
generating, by the predictive storage management device using the first storage device usage data, a first storage device usage trend model;
retrieving, by the predictive storage management device from the first storage system, first storage system implementation information;
generating, by the predictive storage management device using 1) the first storage system implementation information, 2) second storage system implementation information from at least one second storage system that is implemented the same as the first storage system and that includes a second storage device that is the first type of storage device, and 3) an unsupervised machine learning model, a storage system implementation model that identifies storage system characteristics that influence at least one of a use or a behavior of a storage device that is the first type of storage device and that is included in a storage system that is implemented the same as the first storage system and the second storage system;
extrapolating, by the predictive storage management device, the first storage device usage data in the first storage device usage trend model with non-linear time-series trends included in the storage system implementation model to predict future usage of the first storage device; and
performing, by the predictive storage management device based on the predicted future usage of the first storage device, a management action associated with the first storage device.

15. The method of claim 14, wherein the first storage system is included in a Hyper-Converged Infrastructure (HCI) system and the method further comprises:
providing, by the HCI system, the first storage system as a virtualized Storage Area Network (vSAN).

16. The method of claim 14, wherein the first storage system implementation information identifies a configuration of the plurality of storage devices in the first storage system.

17. The method of claim 14, wherein the first storage system implementation information identifies a cache storage device capacity for the first storage system.

18. The method of claim 14, wherein the first storage system implementation information identifies a number of server devices used to provide the first storage system.

19. The method of claim 14, wherein the first storage system implementation information identifies a number of virtual machines utilizing the first storage system.

20. The method of claim 14, wherein the management action associated with the first storage device includes at least one of:
a data purging operation that is performed on the first storage device and that purges data from the first storage device;

a data defragmentation operation that is performed on the first storage device and that defragments data on the first storage device; and a storage reconfiguration operation that is performed on the first storage device and that reconfigures the first storage device.

\* \* \* \* \*